United States Patent [19]

Roberts

[11] 4,376,301

[45] Mar. 8, 1983

[54] SEISMIC STREAMER LOCATOR

[75] Inventor: F. Alex Roberts, Brea, Calif.

[73] Assignee: Chevron Research Company, San Francisco, Calif.

[21] Appl. No.: 215,207

[22] Filed: Dec. 10, 1980

[51] Int. Cl.³ .............................................. G01V 1/38
[52] U.S. Cl. ..................................... 367/19; 367/130; 367/117
[58] Field of Search ................ 367/19, 106, 117, 130, 367/907; 455/40; 375/6; 73/597, 610

[56] References Cited

U.S. PATENT DOCUMENTS

| | | | |
|---|---|---|---|
| 3,840,845 | 10/1974 | Brown | 367/19 |
| 3,860,900 | 1/1975 | Scudder | 367/106 |
| 4,037,189 | 7/1977 | Bell et al. | 367/117 |
| 4,051,350 | 9/1977 | Parent | 367/117 |
| 4,063,213 | 12/1977 | Itrea et al. | 367/19 |
| 4,064,479 | 12/1977 | Ruehle | 340/7 R |
| 4,068,208 | 1/1978 | Rice et al. | 340/7 R |
| 4,087,780 | 5/1978 | Itrea | 367/19 |
| 4,138,657 | 2/1979 | Shave | 340/3 D |
| 4,211,300 | 7/1980 | Miller | 181/120 |
| 4,229,809 | 10/1980 | Schwalbe | 367/106 |
| 4,290,123 | 9/1981 | Pickens | 367/19 |

OTHER PUBLICATIONS

Porter et al., "C. W. Beacon Syst. . . . Determination," 1973, pp. 1691-1699, Jour. Acon. Soc. Am., vol. 53.
Leroy et al., "Acoustic Measuring System . . . ", 5/8/74, pp. 849-863, OTC, vol. I, #2026.
Rogland, "A Dynamic Positioning System . . . " 1965, pp. 1145-1161, Honeywell Inc.
Sherwood, "Acoustic Navigation Systems", 6/64, pp. 22-24, Undersea Technology.

Primary Examiner—Nelson Moskowitz
Attorney, Agent, or Firm—D. A. Newell; E. J. Keeling

[57] ABSTRACT

Method and means are provided for determining the position of a submerged marine streamer towed behind an exploration vessel. A sonic ring around feedback system is employed to redundantly ascertain the distance to various hydrophones housed in the streamer from an outboard mounted transponder capable of generating high frequency sound pulses of short duration.

9 Claims, 2 Drawing Figures

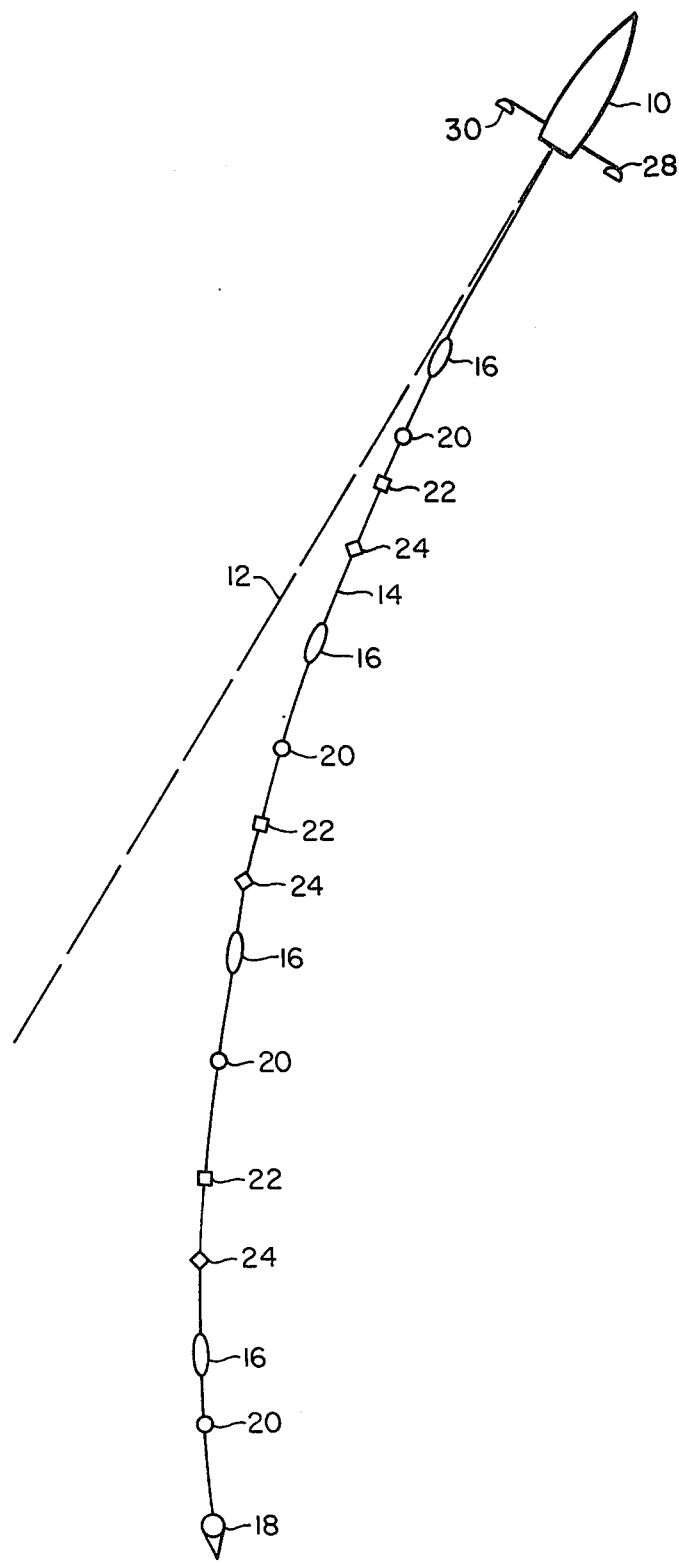
FIG._1.

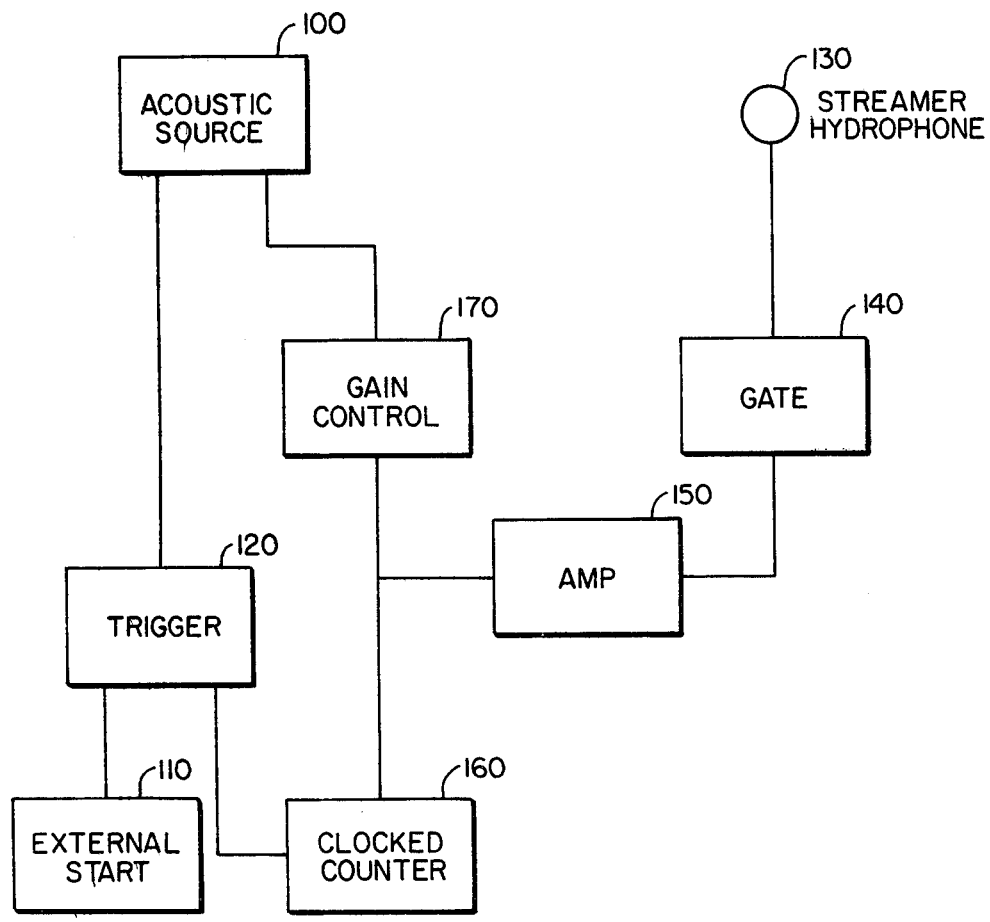
FIG._2.

SEISMIC STREAMER LOCATOR

BACKGROUND OF THE INVENTION

1. Field of the Invention

The present invention finds principal application within the field of marine seismic exploration. More particularly, the invention is concerned with a method and means for accurately determining the position of a towed marine seismic streamer.

2. Prior Art

In marine seismic prospecting, an exploration vessel tows a seismic streamer having a plurality of pressure sensitive detectors, commonly referred to as hydrophones. A source of seismic energy, such as an air gun or an explosive charge, it used to propagate pressure waves through the water into the underlying sea floor. Part of the energy will be reflected by subfloor geological discontinuities and subsequently detected by the hydrophones as pressure variations in the surrounding water. The mechanical energy of these pressure variations is transformed into an electrical signal by the hydrophones and transmitted through the streamer to recording apparatus aboard the vessel. The collected data may then be interpreted by those skilled in the art to reveal information about the subsea geological formations.

For the signals to be meaningful, it is necessary to know the precise location of the individual hydrophones at the time the pressure waves are detected. As the vessel is continually moving and as the streamer may extend for thousands of feet behind the vessel, accurate location of hydrophones is difficult.

Various systems have been developed to provide accurate information as to the location of the vessel, however, it is rare for the streamer to trail directly along the path of the vessel. While the streamer is attached to the stern of the vessel, the bulk of the streamer is submerged below the water surface through the action of depth controllers along the length of the streamer. As a result, the cross-track current velocity at the streamer depth may differ from the cross-track current affecting the vessel, thereby causing the streamer to trail at an angle to the vessel's course. Other factors, which are not necessary to enumerate, may also create a variance in the path of the streamer when compared to the vessel track.

One method of estimating the location of the streamer disclosed in the prior art relies upon the addition of a tail buoy radar reflector located at the end of the streamer. On-board radar systems may then be used under optimal sea conditions to find the end of the streamer and the location of the individual hydrophones interpolated. Such systems are generally unreliable however, and render the required data suspect.

A second method taught by the art relies upon very sensitive and expensive apparatus to measure the yaw and pitch angles of the streamer end adjacent the vessel. These data, coupled with magnetic compass headings taken along the streamer and the known depth of the streamer, permits one to empirically calculate the hydrophone locations.

In normal operations, the vessel travels at a speed of approximately 3 meters per second and sets off original seismic propagations approximately every 10 seconds. The use of seismic propagations at a shorter interval is limited by the time required for the dissipation of all reflected seismic waves. In particular, the use of an air gun at intervals of less than 4 seconds will not permit sufficient dissipation of the sound waves and will result in data that is difficult or impossible to evaluate due to the reflected noise. Thus, the use of an air gun, in combination with the hydrophones for range estimation, presents problems and does not allow for a lack of redundancy in precisely locating the hydrophones.

SUMMARY OF THE INVENTION

The present invention relates to apparatus for use in determining the location of a marine streamer towed behind an exploration vessel. The apparatus includes an acoustic source mounted outboard from the stern of the vessel beneath the water surface which is capable of emitting high frequency sound pulses of short duration upon an external command. A plurality of hydrophones is housed in the streamer capable of receiving pulses from the acoustic source and transmitting signals through separate channels in the streamer in response thereto. To provide redundant measuring capability, a preselected number of hydrophone signals will each trigger additional pulses from the acoustic source. Measurement of the elapsed time from a first externally initiated pulse to the receipt of the last predetermined signal generated by a hydrophone permits an accurate determination of the range.

Preferably, a pair of acoustic sources are mounted apart and outboard from the stern of the vessel which are capable of emitting the high frequency sound pulses. The pair of sources may be used in different time frames to acquire data as to the location of the hydrophones or they may use different frequency pulses which are distinguishable by the hydrophones and in response to which different signals may be returned to the vessel.

It is also preferred to use the return signals from the hydrophones to adjust the amplitude of the acoustic source pulses to minimize the power required for transmission, hence minimizing reverberations.

The frequency of the sounds pulses are preferably in the range between 3.5 and 250 kilohertz and the pulse should normally have a duration running from the time required for a single cycle to approximately 20 cycles.

In one preferred embodiment, all of the hydrophone channels are simultaneously monitored and the acoustic source is triggered into generating additional pulses only after the signal is received responsive to the previous pulse by the last or furthest hydrophone in the streamer.

BRIEF DESCRIPTION OF THE DRAWINGS

FIG. 1 is a top view of a marine streamer being towed by a vessel.

FIG. 2 is a block circuitry diagram of apparatus suitable for use in the invention.

DETAILED DESCRIPTION OF THE PREFERRED EMBODIMENTS

FIG. 1 is a diagrammatic representation of an exploration vessel 10 towing a marine seismic streamer as viewed from above. The track of the vessel is indicated by dashed line 12 and the streamer 14 arcuately trails to one side. A plurality of depth controllers 16 of conventional design maintain the bulk of the streamer at a depth beneath the surface of from approximately 5 to 10 meters. Tail buoy 18 is affixed to the trailing end of streamer 14 and maintains the end of the streamer at the surface. A plurality of hydrophones 20 are spaced along the length of the streamer for detecting pressure variations and transmitting signals announcing the receipt of same along the streamer to recording apparatus aboard the vessel. In addition, the streamer 14 will also house a plurality of depth sensors 22 and magnetic compasses 24 which may be interrogated for information as to the depth and orientation of the streamer at the locations of these instruments.

An air gun 26 is mounted outboard from the stern of vessel 10. In a conventional gun, air, compressed to a pressure in the range, 34 to 550 atmospheres, is suddenly released from a submerged chamber over a period of a few milliseconds to generate an acoustic impulse.

A pair of high frequency acoustic sources, 28 and 30, are mounted outboard from the vessel stern and are typically spaced apart from each other at a distance of 20 to 40 meters. Acoustic sources 28 and 30 generate high frequency pulses of short duration which are received by the hydrophones 20. Upon receipt of the pulses, the hydrophones emit a signal which is transmitted to the vessel along the streamer. The transmitted hydrophone signals are used to trigger additional pulses from the sources 28 and 30 in a controlled oscillation loop. Measurement of the time involved for a given number of oscillations allows redundant, accurate calculations of the distance to the hydrophones, given the velocity of the pulses in water. With the calculated range, location of the hydrophones may be determined precisely in conjunction with the depth data obtained by interrogation of sensors 22.

FIG. 2 illustrates in block form functional circuitry which may be used to accomplish the range-finding objectives stated above. In accordance with FIG. 2, acoustic source 100 is triggered into initiating a pulse, via external start 110 and trigger 120, of high frequency and short duration. The pulse will preferably be in the range, 2 to 100 kilohertz and more preferably in the range, 3 to 10 kilohertz. The pulse length is preferably from monocycle to 20 cycles. Longer pulses may be used but serve no useful purpose. The acoustic source may be piezoelectric, ferroelectric, or electromagnetic in nature. Preferably, the source will comprise a piezoelectric or ferroelectric device having a pencil-shaped acoustic beam oriented in the general direction of the streamer. Such units having a frequency in the range of 2 to 8 kilohertz and capable of generating unit cycle pulses are commercially available.

As mentioned above, the acoustic sources are preferably mounted outboard from the stern of the exploration vessel and are separated by a distance of 20 to 40 meters for triangulation purposes.

The pulse from acoustic source 100 travels through the water at a speed of approximately 1500 meters per second and contacts the streamer hydrophone 130. Hydrophones, such as hydrophone 130, are spaced along the length of the streamer at distances from 100 to 500 meters, and most preferably, at 400 meters. As the pulse is detected, the hydrophone responds and transmits a signal through the streamer to the vessel. Such signals will normally be transmitted along separate electrical conductors extending to each hydrophone. Transmitted signals from the hydrophone pass through a gate 140 which blocks all signals except those that are expected during preselected time intervals. Since the approximate distances from the acoustic sources to the individual hydrophones are known from the spacing of the hydrophones along the streamer, the approximate time "window" for receipt of the signals from the individual hydrophones may be determined. Gate 140 thus serves to block spurious signals generated by reflections from the water surface and ocean floor.

Since the purpose of the present invention is to redundantly determine the location of each hydrophone along the streamer by a ring-around feedback system, the acoustic source must initiate a pulse upon receipt of an incoming hydrophone signal. To prevent the generation of confusing hydrophone signals, each hydrophone is preferably monitored sequentially through individual channels.

The signals passing through gate 140 are amplified and shaped in unit 150. The shaped signals are passed in parallel through a clocked counter 160 and gain control unit 170. The gain control unit automatically adjusts the transmission power of acoustic source 100 in response to the strength of the signals from the amplifier 150 to minimize power consumption. Clocked counter 160 counts the number of feedback signals emanating from the selected hydrophone and times the interval required for a preset number of repetitious signals.

Since the only time lapse of significance is the time required for passage of the acoustic pulse through the water, this time may be repetitiously measured and the average value determined to accurately ascertain the range.

Circuitry is also provided to automatically retrigger an acoustic pulse through trigger 120 in response to the signals passing through counter 160. After a predetermined number of signals, preferably six, have been received, the counter resets to zero to await the beginning of additional range-finding operations for successive hydrophones through external start 110.

Although FIG. 2 depicts only a single acoustic source, it is preferable to use a pair of sources so that independent range determinations may be triangulated to pinpoint the hydrophone position with either the knowledge of the depth or the appropriate compass headings.

If two acoustic sources are employed, they should be alternately used to prevent confusing cross signals or should use differing frequency outputs so that distinguishable signals may be generated by the hydrophones.

In another preferred embodiment, all of the channels from the hydrophones are simultaneously monitored and the receipt of the hydrophone signals are individually timed. However, the acoustic source is triggered into generating a succeeding pulse only after receipt of the incoming hydrophone signal emanated from the last or furthest hydrophone in the streamer.

What is claimed is:

1. Apparatus for use in redundantly determining the position of a seismic marine streamer towed directly behind the stern of a vessel, which comprises:

at least a pair of acoustic sources mounted outboard from the stern of the vessel beneath the water surface, said acoustic sources being laterally spaced apart from each other, and each capable of generating a high frequency acoustic pulse of short duration;

means operable on said vessel for causing each of said sources to generate a first pulse;

at least one hydrophone housed in said streamer capable of receiving each of said first acoustic pulses from each of said sources;

means for transmitting a signal to said vessel through a separate channel in said streamer in response to each of said first pulses received by said hydrophone;

means for monitoring said separate channel from said hydrophone during given time periods and for blocking signals transmitted through said channel during those time periods in which no signal from either of said sources is anticipated;

triggering means responsive to a transmitted hydrophone signal passing through said channel during one of said given time periods for causing either of said pair of said acoustic sources to generate a successive pulse in response to a signal from said hydrophone representing reception of an acoustic pulse from the same acoustic source; and means for separately counting the number of times signals are emitted by said selected hydrophone to generate said successive pulses from each of said pair of acoustic sources and for separately measuring the elapsed times from the first initiated pulse to the receipt of the last selected number of hydrophone signals detected from each of said pair of acoustic sources.

2. Apparatus for use in redundantly determining the position of a marine seismic streamer towed directly behind the stern of a vessel, which comprises:

first and second acoustic sources mounted apart from each other and outboard from the stern of the vessel below the water surface, each source being capable of generating high frequency acoustic pulses of short duration;

at least one hydrophone housed in said streamer capable of receiving pulses from said acoustic sources and means for transmitting a signal to said vessel through a separate channel in said streamer in response thereto;

means for monitoring said separate channel from said at least one hydrophone in a given time period and for blocking transmitted signals through said channel during those time periods in which no pulses are anticipated from either of said first or second acoustic sources;

external means operable on said vessel for causing said first source to generate a pulse;

triggering means responsive to a transmitted signal during a first given time period for causing said first acoustic source to generate another pulse;

means for counting the number of times signals are emitted by said at least one hydrophone to generate said successive pulses and means for measuring the elapsed time from the first pulse generated by said first source to the receipt of the last of a selected number of hydrophone signals generated by said first acoustic source;

means for causing said second source to generate a pulse after said first source has completed transmitting pulses for said at least one hydrophone;

triggering means responsive to a transmitted signal during another given time period for causing said second acoustic source to generate a successive pulse; and means for counting the number of times signals are emitted by said at least one hydrophone to generate said successive pulses and means for measuring the elapsed time from the first pulse generated by said second source to receipt of the last of a selected number of hydrophone signals generated by said second acoustic source.

3. Apparatus for use in redundantly determining the position of a seismic marine streamer towed behind the stern of a vessel, which comprises:

a first acoustic source mounted outboard from the stern of the vessel beneath the water surface which is capable of generating high frequency acoustic pulses of short duration;

a second acoustic source mounted apart from said first acoustic source and outboard from the stern of the vessel beneath the water surface which is capable of generating a high frequency acoustic pulse of short duration that is distinguishable from pulses from said first acoustic source;

means operable on said vessel for causing each of said first and second acoustic sources to generate their respective pulses;

at least one hydrophone housed in the streamer capable of receiving said pulses from said acoustic sources and means for transmitting distinguishable signals through a separate channel in the streamer to said vessel in response thereto;

means for monitoring said separate channel from said at least one hydrophone in given time periods and for blocking signals through said separate channel during those times in which no acoustic pulses are expected from either of said acoustic sources;

first triggering means for causing said first acoustic source to generate another pulse in response to receipt of a nonblocked transmitted hydrophone signal during a first given time period, said signal being emitted as a result of a pulse received from said first acoustic source;

second triggering means for causing said second acoustic source to generate another pulse in response to another transmitted hydrophone signal during a second given time period emitted as a result of a pulse received from the second acoustic source; and means for counting the number of times signals are emitted by said at least one hydrophone to generate said other pulses after a predetermined number of signals from said hydrophone have been counted as a result of pulses generated by said first and second acoustic sources and for measuring the elapsed time from the first initiated pulse to the receipt of the last of a selected number of hydrophone signals from each of said acoustic sources.

4. Apparatus for use in redundantly determining the position of a marine streamer towed directly behind the stern of a vessel, which comprises:

(a) at least a pair of acoustic sources mounted outboard from the stern of the vessel and laterally spaced apart beneath the water surface, said sources being capable of generating high frequency sound pulses of short duration;

(b) means operable on said vessel for causing said sources independently to generate pulses;

(c) a plurality of hydrophones spaced apart along the length of said streamer capable of receiving said pulses and means for transmitting a signal to said vessel through separate channels in said streamer in response to each of the source originated pulses being received by each of said hydrophones;

(d) means for blocking signals transmitted through said channels during preselected time periods in which no signals from either of said pair of sources are anticipated;

(e) triggering means responsive to a nonblocked hydrophone signal generated by one of said sources and transmitted from the furthest hydrophone in said streamer for causing said one acoustic source to generate another pulse;

(f) means for counting the number of times signals are emitted by said furthest hydrophone in response to said one source and for stopping the generation of said other pulses by said one source after a predetermined number of said signals have been received;

(g) means for simultaneously monitoring the channels from all of said hydrophones and measuring the elapsed time from initiation of the first acoustic pulse by said one source to the receipt of each hydrophone signal in response to said one source along the length of said streamer;

(h) additional triggering means responsive to a nonblocked hydrophone signal generated by the other of said sources and transmitted from the furthest hydrophone in said streamer for causing said other acoustic source to generate another pulse;

(i) means for counting the number of times signals are emitted by said furthest hydrophone in response to said other source and for stopping the generation of said other pulses by said other source after a predetermined number of said signals have been received; and (j) means for simultaneously monitoring the channels from all of said hydrophones and measuring the elapsed time from initiation of the first acoustic pulse by said other source to the receipt of each hydrophone signal in response to said other source along the length of said streamer.

5. Apparatus for use in determining the location of a marine streamer as recited in claims 1, 2, 3 or 4, further comprising: means to automatically limit the amplitude of the acoustic source pulses with respect to the receiving sensitivity of the hydrophone to reduce reverberation from the air-sea interface and the ocean floor and to minimize power consumption by said acoustic sources.

6. Apparatus for determining the location of a marine streamer as recited in claims 1, 2, 3 or 4, wherein the frequency of the acoustic pulses from the acoustic sources is between 3.5 and 10 kilohertz and said pulses have a duration in the range of monocycle in 20 cycles.

7. A method of redundantly determining the position of a marine streamer towed behind the stern of a vessel, which comprises:

generating first acoustic pulses of high frequency and short duration with at least two acoustic sources spaced apart beneath the water surface and outboard from the vessel stern;

said acoustic pulses being distinguishable from each other by at least one hydrophone housed in the streamer, separately detecting said acoustic pulses and in response thereto transmitting a signal along a separate channel carried by the streamer to said vessel;

blocking transmission of signals along said channel during time periods in which no acoustic pulses are anticipated;

triggering one of said acoustic sources into generating another acoustic pulse upon receipt of an unblocked signal corresponding to a pulse from said one source being received by said hydrophone;

triggering the other of said acoustic sources into generating another acoustic pulse upon receipt of an unblocked signal corresponding to a pulse from said other source being received by said hydrophone;

separately counting the number of signals emitted by said hydrophone in response to each of said acoustic pulses and stopping the generation of other pulses by each of said sources after predetermined numbers of signals have been counted from each of said sources; and separately measuring the time lapse from the time of initiation of said first pulse to the time of receipt of the last of said predetermined numbers of hydrophone signals for each of said two acoustic sources.

8. A method of redundantly determining the position of a marine streamer towed behind the stern of a vessel which comprises:

generating a first acoustic pulse of high frequency and short duration which an acoustic source located beneath the water surface outboard from the stern of the vessel;

generating a second acoustic pulse of high frequency and short duration with another acoustic source laterally spaced apart from the first acoustic source beneath the water surface;

detecting said first and second acoustic pulses with at least one hydrophone housed in the streamer, said hydrophone responding by transmitting separate signals along a separate channel carried by the streamer to said vessel;

blocking transmission of signals along said channel during those time periods in which no acoustic pulses are anticipated from either said first or said other acoustic sources;

triggering said first acoustic source into generating another pulse upon receipt of an unblocked signal from said hydrophone corresponding to reception of said first pulse from said first acoustic source;

triggering said other acoustic source into generating a further pulse upon receipt of an unblocked signal from said hydrophone corresponding to reception of said second pulse from said other acoustic source;

separately counting the number of signals emitted by said hydrophone from said first and said other acoustic sources and stopping the generation of said other pulses after predetermined numbers of signals have been counted from each of said sources;

measuring the time lapse from the initiation of said first pulse to the receipt from said hydrophone of said predetermined number of signals emitted in response to said other pulses from said first acoustic source; and separately measuring the time lapse from the initiation of said second pulse to the receipt from said hydrophone of said predetermined number of signals emitted in response to said further pulses from said other acoustic source.

9. A method of redundantly determining the position of a marine streamer towed behind the stern of a vessel, which comprises:

generating first acoustic pulses of high frequency and short duration with each of at least a pair of acoustic sources located beneath the water surface and laterally spaced apart from each other outboard from the vessel stern, said acoustic pulses from said pair of acoustic sources being distinguishable from each other;

detecting each of said acoustic pulses with at least one hydrophone housed in the streamer which responds by transmitting a signal corresponding to each of said pulses along a separate channel carried by the streamer to said vessel;

blocking transmission of signals along said channel during each time period in which no acoustic pulses are anticipated;

triggering each of said pair of acoustic sources into generating another acoustic pulse upon receipt of an unblocked signal corresponding to a signal from the one of said acoustic sources generating said pulse;

separately recording a quantity representative of the average travel time of said first pulse and a plurality of said other pulses to said hydrophone in said streamer from each of said acoustic sources; and in response to a given value of said quantity stopping the generation of said other acoustic pulses by each of said sources.

* * * * *